Patented May 1, 1945

2,374,841

UNITED STATES PATENT OFFICE 2,374,841

COPOLYMERS OF ACRYLIC NITRILES WITH LESSER AMOUNTS OF CONJUGATED DIENES

Waldo L. Semon, Silver Lake, Ohio, assignor to The B. F. Goodrich Company, New York, N. Y., a corporation of New York No Drawing. Application January 27, 1940, Serial No. 316,053

8 Claims. (Cl. 260—84.5)

This invention relates to flexible, oil resistant materials and to a method of preparing the same. More particularly, this invention relates to the polymerization products obtained from mixtures of acrylic nitriles with lesser amounts of polymerizable dienes, and to a method of preparing said polymerization products.

As is known, acrylic nitriles as well as similar vinyl compounds may be polymerized to saturated linear polymers which are characterized chemically by their stability, and physically by their thermoplasticity. Polymeric acrylic nitriles are further characterized by an unusual insolubility, these materials being substantially insoluble at ordinary temperatures in all the common resin solvents, and by a friability and brittleness which seriously impairs their usefulness.

Acrylic nitriles have also been jointly polymerized with other polymerizable compounds to form copolymers of varying properties. In general, the copolymers produced by the polymerization of a mixture containing an acrylic nitrile as the major constituent together with another vinyle compound such as styrene, acrylic esters, vinyl chloride, vinyl acetate, and vinyl ethers are soluble in a number of solvents, hence their use in coating compositions, but are brittle so that molded products produced therefrom lack shock resistance. On the other hand, copolymers produced by the polymerization of mixtures containing an aliphatic diene and an acrylic nitrile as the minor constituent are rubber-like in properties.

I have now discovered that if an acrylic nitrile and conjugated diene are mixed in such proportions that the acrylic nitrile is present in amounts by weight greater than the conjugated diene, and polymerized, copolymers are obtained whose properties are clearly different from any previously described copolymers containing either acrylic nitriles or conjugated dienes or both. Thus, the copolymers from an acrylic nitrile and a conjugated diene to which this invention relates are neither elastic and rubber-like as are such copolymers containing a preponderance of diene, nor are they brittle and easily dissolved as are copolymers of acrylic nitrile and vinyl compounds, but these materials possess new properties in that they are remarkably tough, flexible, leather-like and exceedingly solvent resistant.

As hereinabove mentioned, the new and valuable copolymers of the present invention may be produced by the simultaneous polymerization of a mixture containing an acrylic nitrile or a mixture of acrylic nitriles of the formula

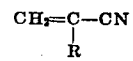

wherein R may be hydrogen or alkyl, and a lesser amount by weight of a conjugated diene or a mixture of dienes of the formula

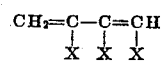

wherein each X may be hydrogen or methyl. As specific examples, acrylonitrile or methacrylonitrile may be copolymerized with butadiene, isoprene, dimethyl butadiene or the like. However because of the lower cost of the initial materials it is preferable to use acrylonitrile and butadiene.

Although materials of the general properties herein described are produced from any desired mixtures of the polymerizable ingredients, provided the nitrile is present in an amount exceeding 50% by weight of the mixture, it has been found most desirable to employ between about 65 and 80% by weight of the nitrile in order to obtain copolymers of the most pronounced toughness and leather-like characteristics. If less than about 65% by weight of the nitrile is used a polymer is obtained which is not so resistant to solvents such as mineral oils and which, moreover, is somewhat softer and more extensible. On the other hand, if more than about 80% of acrylonitrile is used, the polymerization product becomes less flexible.

A number of methods may be employed for effecting polymerization of the mixed ingredients. Polymerization may be made to take place in a homogeneous system by the application of heat, actinic light or pressure to the mixture either with or without the presence of a solvent and/or a polymerization catalyst. However, because of the greater ease of manipulation and the improved condition of the polymers produced it is preferred to carry out the polymerization in emulsion with a non-solvent medium, such as water, in the presence of a neutral, acidic or alkaline emulsifying agent and also, preferably, in the presence of a polymerization accelerator or catalyst. The usual emulsifying agents such as an alkali metal salt of a fatty acid, for example, sodium palmitate; a hymolal sulfate or sulfonate or aromatic sulfonate, for example isobutyl naphthalene sulfonic acid; a salt of a high molecular weight organic base, for example, the hydrochloride of diethylaminoethyloleylamide or some other emulsifying agent may be used. A very effective emulsifying agent is a 2-3% water emulsion of a fatty acid such as palmitic or myristic acid, which has been 80-95% neutralized with alkali. Among the substances which have been found to influence favorably the rate of polymerization, i. e. catalysts, the following are to be mentioned: oxygen, hydrogen peroxide diazoaminobenzene, dipotassium diazomethanedisulfonate, benzoyl peroxide, potassium persulfate and other oxidizing agents. Likewise, if hydrogen peroxide is used as the catalyst it will be advantageous to use in connection therewith some substance which forms a complex with hydrogen peroxide such as sodium oxalate, sodium pyrophosphate, potassium fluoride, urea, glycine, alanine and the like. Other materials known to direct the polymerization process in a preferred manner or to improve some property of the copolymer, may also be added to the polymerization mixture, if desired.

Polymerization of the emulsion is preferably carried out at temperatures between 30° C. and 70° C. and preferably with continued shaking or stirring. The polymerization products are obtained in a milky emulsion which resembles rubber latex and which may be coagulated by the methods ordinarily used to coagulate rubber latices, for example, by freezing out, by addition of acid, alcohol, or salts or by a combination of these methods.

The copolymers obtained by the above or other polymerization processes are tough, leathery substances which may be rolled into thin sheets on an ordinary hot rubber mill and, thence, without addition of any modifying ingredients and without vulcanization, these materials may be used in the manufacture of articles in which a permanent flexibility and superior oil resistance is required. Articles made from such materials will withstand the action of mineral oils or other solvents under conditions which would swell ordinary rubbery or resinous materials, and are also more heat and abrasive resistant. The toughness and flexibility of these materials also suggest their usage as leather or linoleum substitutes.

If desired, pigments, fillers and plasticizing agents which are compatible with the above mentioned copolymers may be incorporated therewith, to impart greater plasticity or to lend the material some special properties. For example, suitably plasticized compositions prepared from these copolymers may be formed into any desired shape by pressing or extruding and then by subjecting said composition to heat and/or pressure, useful molded articles may be produced.

It may also be mentioned that copolymers prepared from mixtures containing relatively large proportions of the diene, say 40%, may be mixed with sulphur and vulcanized as in the manner of rubber-like materials, obtaining thereby products exhibiting increased extensibility.

The following examples will further illustrate how my invention may be carried out in practice, but the invention is not restricted to these examples. The parts are by weight.

*Example 1*

Seventy parts of acrylonitrile and 30 parts of butadiene are emulsified with 150 parts of a 5% aqueous solution of the hydrochloride of diethylaminoethyloleylamide and polymerized for five days at 60° C. with agitation of the emulsion. Thus is obtained a latex-like mass from which by coagulation and by washing and drying of the coagulum there is obtained a strong, tough polymerization product which may be worked satisfactorily on rollers. This product is unaffected by immersion in mineral oils and is also remarkably resistant to abrasion.

*Example 2*

A mixture of 75 parts of acrylonitrile and 25 parts of butadiene is emulsified with 250 parts of at 1½% aqueous solution of a fatty acid soap and 10 parts of a 3% solution of hydrogen peroxide, and polymerized by agitating at 40° C. for 72 hours. There is produced in almost quantitative yield a polymerization product which is tough and leather-like and is resistant to swelling by mineral oils.

*Example 3*

If in the mixture described in Example 2, methacrylonitrile be used instead of acrylonitrile, a tough, flexible thermoplastic product is obtained which because of its increased plasticity is better adapted for use in the production of molded products.

I claim:

1. The process which comprises copolymerizing a mixture of an acrylic nitrile of the formula

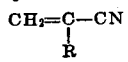

wherein R is a member of the class consisting of hydrogen and alkyl and a conjugated diolefin of the formula

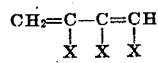

wherein each X is a member of the class consisting of hydrogen and methyl, said mixture containing between about 65 and 80% by weight of the acrylic nitrile.

2. The process which comprises emulsifying a mixture of an acrylic nitrile of the formula

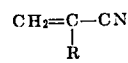

wherein R is a member of the class consisting of hydrogen and alkyl and a conjugated diolefin of the formula

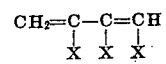

wherein each X is a member of the class consisting of hydrogen and methyl, said mixture containing between about 65 and 80% by weight of the acrylic nitrile, with a non-solvent liquid and copolymerizing the emulsion thus formed.

3. The process which comprises emulsifying a mixture of an acrylic nitrile of the formula

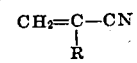

wherein R is a member of the class consisting of hydrogen and alkyl and a conjugated diolefin of the formula

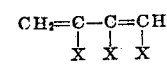

wherein each X is a member of the class consisting of hydrogen and methyl, said mixture containing between about 65 and 80% by weight of the acrylic nitrile, with water in the presence of an emulsifying agent and a polymerization catalyst and copolymerizing the emulsion thus formed.

4. The process which comprises copolymerizing a mixture of acrylonitrile and butadiene, said mixture containing between about 65 and 80% by weight of acrylonitrile.

5. The process which comprises emulsifying a mixture of acrylonitrile and butadiene, said mixture containing between about 65 and 80% by weight of acrylonitrile, with water in the presence of an emulsifying agent and a polymerization catalyst, and copolymerizing the emulsion thus formed.

6. The copolymerization products obtained by the polymerization of mixtures of acrylonitrile and butadiene, said mixtures containing between 65 and 80% by weight of acrylonitrile.

7. The copolymerization products obtained by the polymerization of mixtures of methacrylonitrile and butadiene, said mixtures containing between 65 and 80% by weight of methacrylonitrile.

8. The copolymerization products obtained by the polymerization of mixtures of an acrylic nitrile of the formula

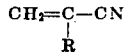

wherein R is a member of the class consisting of hydrogen and alkyl and a conjugated diolefin of the formula

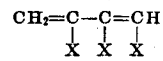

wherein each X is a member of the class consisting of hydrogen and methyl, said mixtures containing between 65 and 80% by weight of the acrylic nitrile.

WALDO L. SEMON.